United States Patent
Zhang et al.

(10) Patent No.: US 7,869,955 B2
(45) Date of Patent: Jan. 11, 2011

(54) SUBSURFACE PREDICTION METHOD AND SYSTEM

(75) Inventors: Libo Zhang, Katy, TX (US); Eike F. Rietsch, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 246 days.

(21) Appl. No.: 12/022,332

(22) Filed: Jan. 30, 2008

(65) Prior Publication Data

US 2009/0192718 A1      Jul. 30, 2009

(51) Int. Cl.
    G01V 1/00      (2006.01)
(52) U.S. Cl. ............... 702/14; 702/6; 702/12; 702/18; 367/14; 367/21; 73/1.85
(58) Field of Classification Search ........... 702/6, 702/12, 14, 18; 367/14, 21; 73/1.85
See application file for complete search history.

(56) References Cited

U.S. PATENT DOCUMENTS

| | | | |
|---|---|---|---|
| 2,661,523 A | 12/1953 | Houck et al. |
| 3,220,844 A | 11/1965 | Yudelson et al. |
| 3,277,233 A | 10/1966 | Ross et al. |
| 4,052,237 A | 10/1977 | Appleby et al. |
| 4,108,707 A | 8/1978 | Appleby et al. |
| 4,447,807 A | 5/1984 | Klein et al. |
| 4,471,520 A | 9/1984 | Houck et al. |
| 4,509,244 A | 4/1985 | Houck et al. |
| 4,586,234 A | 5/1986 | Choate et al. |
| 4,600,027 A | 7/1986 | Houck et al. |
| 4,646,912 A | 3/1987 | Houck et al. |
| 4,773,928 A | 9/1988 | Houck et al. |
| 4,829,573 A | 5/1989 | Gagnon et al. |
| 4,893,694 A | 1/1990 | Houck et al. |
| 5,277,401 A | 1/1994 | Butler et al. |
| 5,488,693 A | 1/1996 | Houck et al. |
| 5,578,098 A | 11/1996 | Gagliardi et al. |
| 5,610,329 A | 3/1997 | Yovichin et al. |
| 5,642,328 A | 6/1997 | Houck et al. |

(Continued)

FOREIGN PATENT DOCUMENTS

GB      2 432 936 A      6/2007

OTHER PUBLICATIONS

Chen et al., 'Characterizing Lithofacies from Geophysical Data Using the Bayesian Model Coupled with a Fuzzy Neural Network', 2001, UCB Publication, pp. 1-4.*

(Continued)

*Primary Examiner*—Eliseo Ramos Feliciano
*Assistant Examiner*—Elias Desta
(74) *Attorney, Agent, or Firm*—Carlos L. Hanze

(57) ABSTRACT

A method of predicting subsurface properties of a geologic formation includes acquiring seismic data for a subsurface region including the geologic formation of interest, computing seismic attributes of the measured seismic data over at least part of this geologic formation, determining internally consistent rock properties representative of the geologic formation, generating models of the same part of the geologic formation with these rock properties, computing synthetic seismic data from the models, computing the same attributes from these synthetic seismic data, and using Bayesian analysis to predict, from the probability of modeled attributes given the models, the probability of the actual subsurface properties given the measured attributes.

18 Claims, 5 Drawing Sheets

U.S. PATENT DOCUMENTS

| | | | |
|---|---|---|---|
| 5,838,634 A | 11/1998 | Jones et al. | |
| 5,915,387 A | 6/1999 | Baggett et al. | |
| 6,148,264 A | 11/2000 | Houck et al. | |
| 6,438,493 B1 | 8/2002 | West et al. | |
| 6,442,487 B2 * | 8/2002 | Kim | 702/6 |
| 6,549,854 B1 | 4/2003 | Malinverno et al. | |
| 6,560,540 B2 | 5/2003 | West et al. | |
| 6,603,313 B1 | 8/2003 | Srnka | |
| 6,662,112 B2 | 12/2003 | Eastwood et al. | |
| 6,744,729 B2 | 6/2004 | Tinsley et al. | |
| 6,847,682 B2 | 1/2005 | Liang | |
| 6,901,333 B2 | 5/2005 | Van Riel et al. | |
| 6,904,367 B2 | 6/2005 | Cook et al. | |
| 6,950,786 B1 | 9/2005 | Sonneland et al. | |
| 6,952,649 B2 | 10/2005 | Cook et al. | |
| 6,999,879 B2 | 2/2006 | Houck | |
| 7,082,368 B2 | 7/2006 | Nickel | |
| 7,127,041 B1 | 10/2006 | Houck | |
| 7,373,251 B2 * | 5/2008 | Hamman et al. | 702/14 |
| 2002/0042677 A1 | 4/2002 | West et al. | |
| 2002/0096237 A1 | 7/2002 | Burhoe et al. | |
| 2002/0183932 A1 | 12/2002 | West et al. | |
| 2003/0041159 A1 | 2/2003 | Patton | |
| 2003/0043815 A1 | 3/2003 | Tinsley et al. | |
| 2003/0046006 A1 | 3/2003 | Eastwood et al. | |
| 2003/0147466 A1 | 8/2003 | Liang | |
| 2004/0143811 A1 | 7/2004 | Kaelicke et al. | |
| 2004/0230379 A1 | 11/2004 | Houck | |
| 2005/0090986 A1 | 4/2005 | Van Riel et al. | |
| 2005/0182852 A1 | 8/2005 | Tinsley | |
| 2005/0273266 A1 | 12/2005 | Nickel | |
| 2006/0212225 A1 | 9/2006 | Bachrach et al. | |

OTHER PUBLICATIONS

Houck, 'Estimating uncertainty in interpreting seismic indicators', Mar. 1999, pp. 320-325.*

Houck, Richard T., "Quantifying the Uncertainty in an AVO Interpretation," *Geophysics*, vol. 67, No. 1, Jan.-Feb. 2002), pp. 117-125.

R. T. Houck "Estimating uncertainty in interpreting seismic indicators", The Leading Edge, vol. 18, Mar. 1999, pp. 320-325.

P. Avseth et al "Seismic reservoir mapping from 3-D AVO in a North Sea turbidite system" Geophysics, vol. 66, No. 4, 2001, pp. 1157-1176.

* cited by examiner

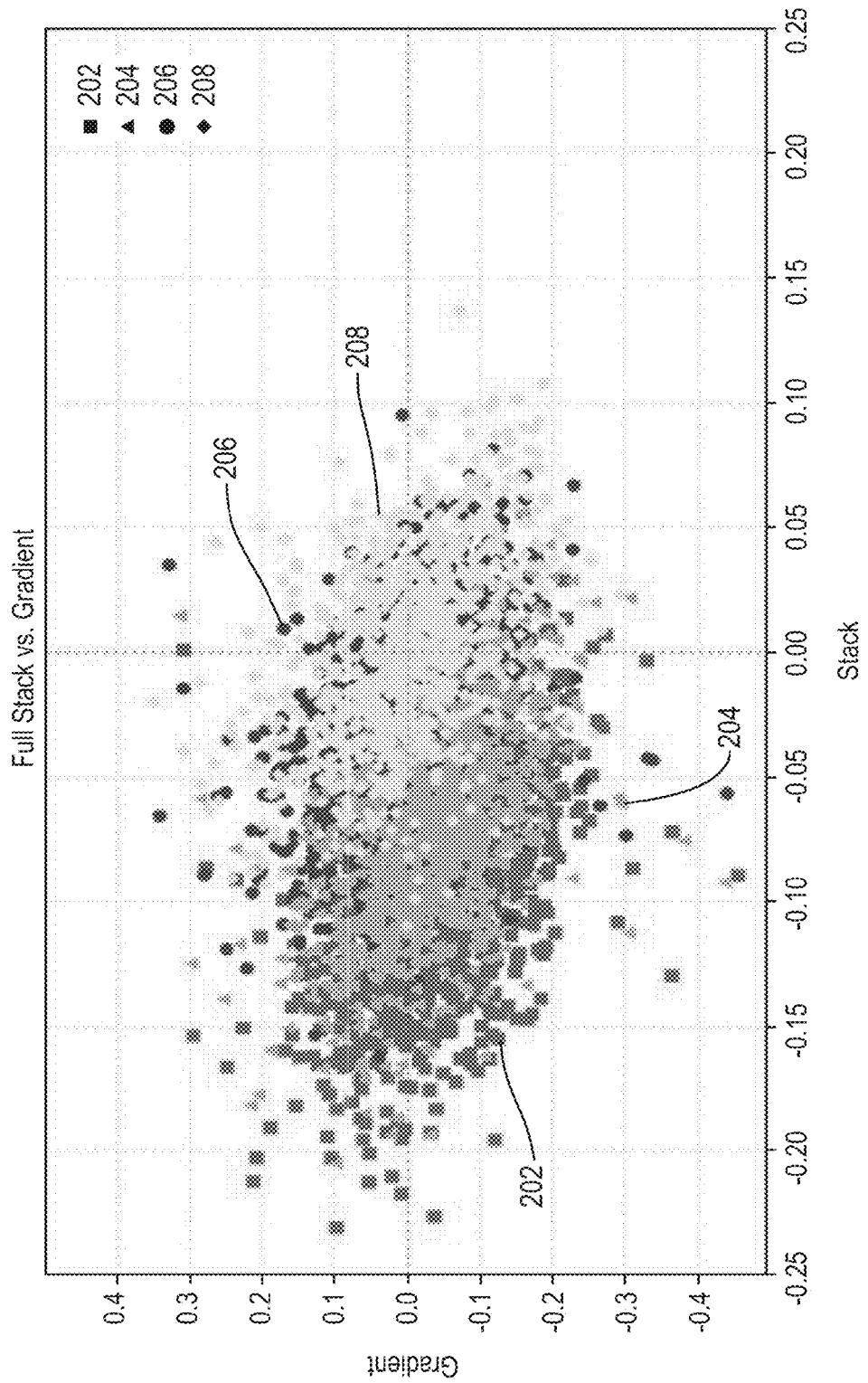

SUBSURFACE PREDICTION METHOD AND SYSTEM

BACKGROUND

1. Field of the Invention

The present invention relates generally to modeling subterranean features and more particularly to analysis of seismic data using probabilistic comparisons between the data and modeled seismic data.

2. Description of the Related Art

Seismic data acquisition is the most common means to get information about subsurface features. Commonly, acoustic signals are successively generated at a set of regular grid points and reflected signals, resulting from interfaces between subterranean features having different elastic properties are recorded via detectors positioned at or below the surface. Typically, the detectors are similarly arranged in a regular grid, which may coincide with the grid of source locations. The signal recorded by a detector is called a seismic trace. The seismic traces are then sorted into gathers, possibly after some preliminary processing, such that traces in a specific gather represent reflections from about the same subsurface reflection point. Hence, each trace in such a Common Reflection Point gather has a different source and has been recorded by a different receiver. It is usually identified by the geographic location of the reflection point and by the distance (offset) between the source and the detector. Because reflection amplitudes depend on the angle at which a signal impinges on an interface, and because this angle depends on the source-detector offset, the reflection amplitudes are offset-dependent. The offset (or angle-of-incidence) dependence can be exploited to determine properties of rocks in the subsurface region.

SUMMARY

Aspects of embodiments of the present invention provide a method of predicting subsurface properties of a geologic formation including acquiring seismic data for a subsurface region including the geologic formation, computing seismic attributes from the acquired seismic data, physically constraining modeled data representing hypothetical physical properties for at least a portion of the geologic formation, computing synthetic seismic data from the physically constrained modeled data, computing synthetic seismic attributes based on the computed synthetic seismic data and applying Bayesian analysis using the computed synthetic seismic attributes, to predict a probability of a particular subsurface property given the measured seismic attributes.

Aspects of embodiments of the invention provide a system for predicting subsurface properties of a geologic formation including a memory configured to store data including seismic data acquired from a subsurface region including the geologic formation, a processor, configured and arranged to compute seismic attributes from the acquired seismic data and to compute synthetic seismic data from modeled data and to compute seismic attributes corresponding to the computed synthetic seismic data, and to apply Bayesian analysis to the computed seismic attributes from the acquired seismic data using the computed seismic attributes corresponding to the computed synthetic seismic data.

Aspects of embodiments of the invention may include a computer-readable medium encoded with computer-executable instructions for performing the foregoing method or for controlling the foregoing device.

Aspects of embodiments of the invention may include a system incorporating the foregoing device and configured and arranged to provide control of the device in accordance with the foregoing method. Such a system may incorporate, for example, a computer programmed to allow a user to control the device in accordance with the method, or other methods.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various FIGS. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIGS. 6A and 6B illustrate graphical displays of attributes computed from synthetic geophysical properties in a method in accordance with an embodiment of the present invention.

DETAILED DESCRIPTION

As noted above, amplitude variation versus offset ("AVO") measurements may be used as a direct hydrocarbon indicator, identifying subsurface regions where drilling may be expected to find hydrocarbon resources. In practice, it may be difficult to differentiate between a region containing oil, gas or brine. It may likewise be possible that a signal that seems on its face to identify oil or gas merely indicates a non-resource bearing rock feature. As a result, the inventors have determined that it may be useful to provide additional tools for interpreting AVO data to reduce risk associated with expensive drilling activities.

Figure 1:
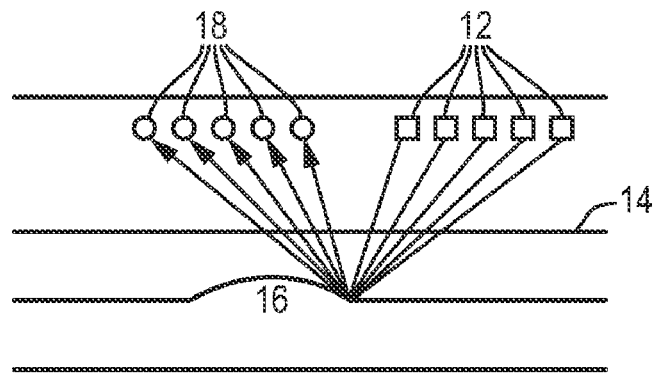
FIG. 1 illustrates an example of a system in accordance with an embodiment of the present invention.

FIG. 1 schematically illustrates an example of a common reflection point gather system in accordance with an embodiment of the present invention. Though the illustrated example relates to a marine environment, in principle the same approach applies equally well to land-based seismic exploration. An array of seismic sources 12, for example an air gun or air gun array, carried or towed by a ship, is used to generate an acoustic energy pulse that propagates through the ocean and impinges on the sea floor 14. The acoustic energy continues through the sea floor material and strikes a feature 16 in a region of interest that acts as a strong reflector. This may be, for example, an interface between different rock layers, a surface of a salt dome, or a fluid interface.

The reflected energy (arrows) returns to the surface and is detected by an array of detectors (hydrophones in this case) 18 that may be towed from the ship or from a separate ship. Each detector may be said to have a particular offset from the source. Those detectors with the smallest offset (the right-hand detectors 18 in the FIG.) are referred to as "near" while those with the largest offset are referred to as "far". Because the travel time for a reflected signal increases with increasing offset, a time correction is applied so that the reflected signal is displayed at the same time on each trace, regardless of the offset.

To extract information from the complex seismic signals it is common to compute attributes of various kinds. These attributes can relate to individual traces of the gather, for example, a trace's maximum reflection amplitude. Or they may relate to the gather as a whole, for example, the average amplitude (stack), the slope of the amplitude change with offset (gradient), or the second derivative of the amplitude change with offset (curvature). Likewise, attributes including, intercept and intercepting gradient, among others, may find application in embodiments of the present invention.

Figure 2:
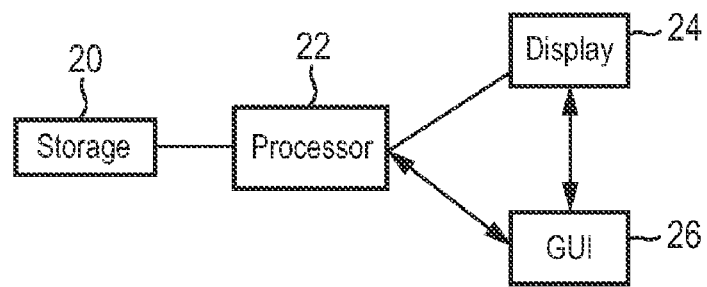
FIG. 2 is a schematic diagram of an embodiment of a system for implementing methods in accordance with the present invention.

Data collected at the detectors 18 may be collected and stored, for example, in a data storage device 20 as schematically illustrated in FIG. 2. The stored data may be made available to a processor 22, such as a programmable general purpose computer. The processor 22 may include interface components such as a display 24 and a graphical user interface 26. The graphical user interface may be used both to display data and processed data products and to allow the user to select among options for implementing aspects of the method.

Figure 3:
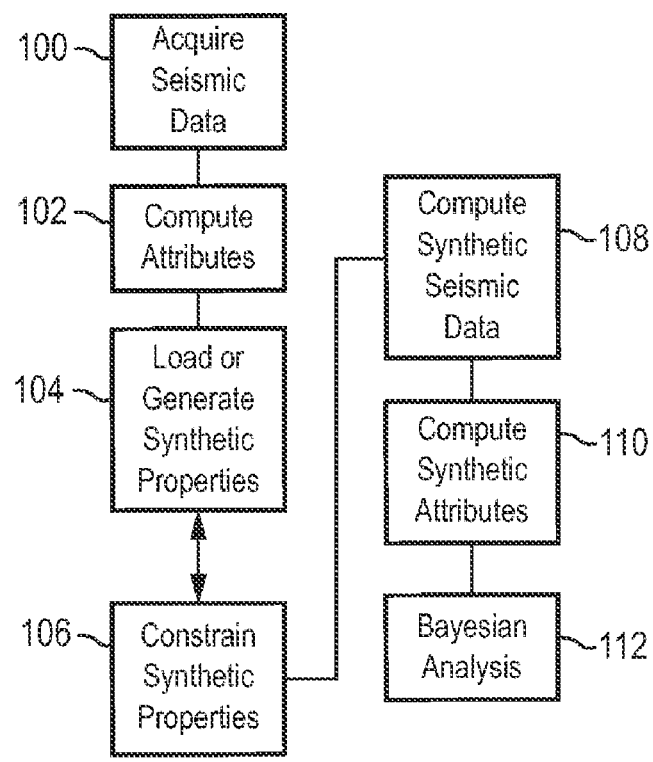
FIG. 3 is a flow diagram illustrating acts of a method in accordance with an embodiment of the present invention.

As illustrated in the flow chart of FIG. 3, a method of predicting subsurface properties begins (100) by acquiring the seismic data as described above. The processor then computes (102) seismic attributes from acquired seismic data. Computed attributes may include, for example, slope or gradient, curvature, intercept, near angle, far angle, near stack, and far stack, though others may be apparent to one of ordinary skill in the art.

Figure 4:
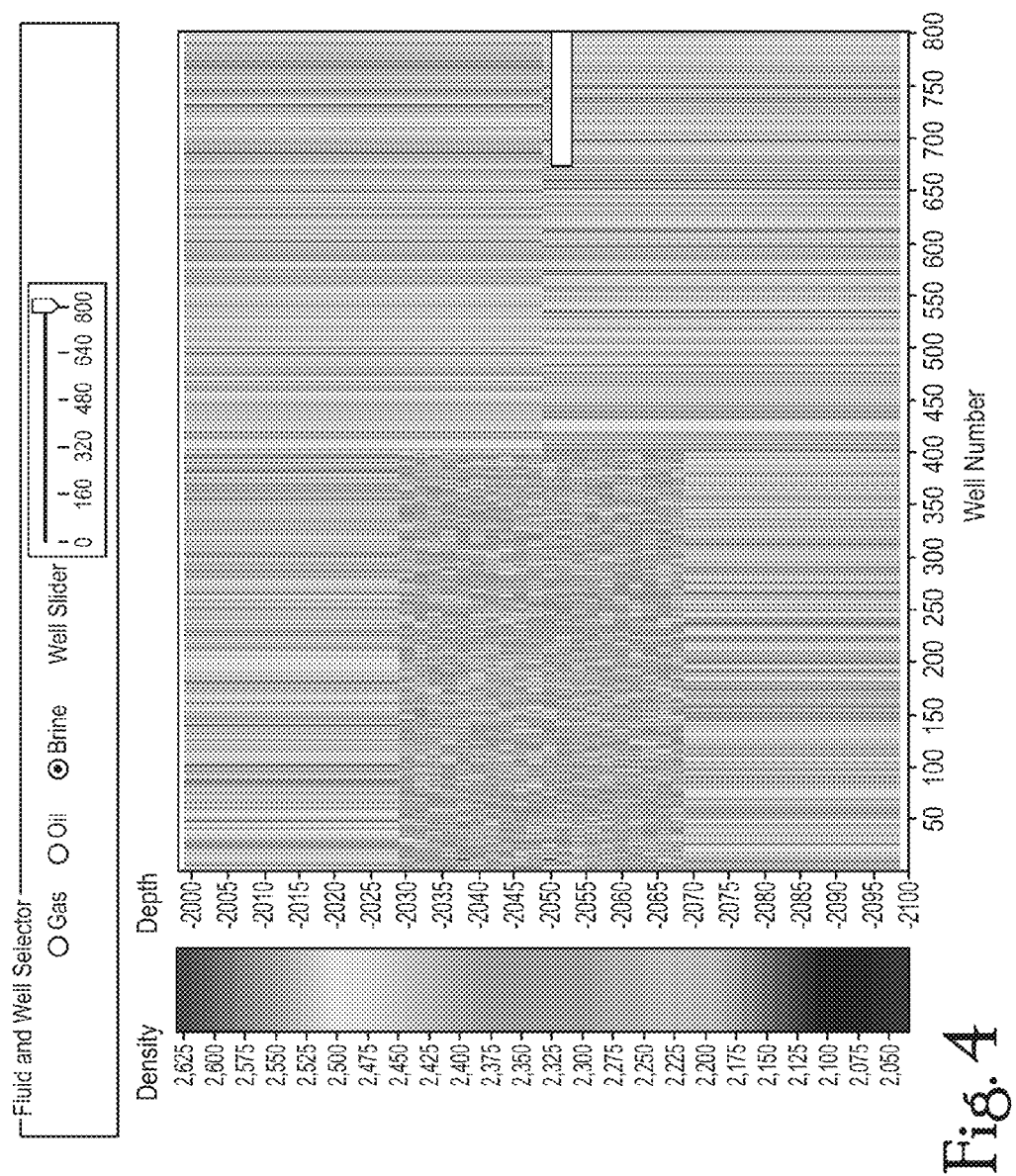
FIG. 4 is an illustration of a map of a plurality of synthetic geophysical properties for use in a method in accordance with an embodiment of the present invention.

Hypothetical physical properties for at least a portion of the formation under investigation are generated or loaded (104). In a particular approach, a number of pseudo-wells, for example, hundreds or thousands of pseudo-wells, are generated. FIG. 4 illustrates an example of 800 pseudo-wells having various makeups. In FIG. 4, density profiles are shown for each pseudo-well, however pseudo-wells may include physical properties such as $V_p$, $V_s$, density, porosity, shale volume ($V_{shale}$), saturation, pore fluid type or other properties.

The pseudo-wells may be generated using a partially random approach. Rather than using a simple stochastic approach, in which any particular physical model is equally likely, the generation of the pseudo-wells may be constrained by physical constraints (106). The constraining may take place prior to the generating, or alternately, purely stochastic pseudo-wells may be later constrained (e.g., by eliminating wells having characteristics outside the constraints). As will be appreciated, it is likely to be more efficient to first constrain, then generate, the wells, but either approach should be considered to be within the scope of the present invention.

Rather than generating pseudo-wells, pseudo-well data may be collected from previously existing data sets. In this approach, it may be useful to additionally process the data so that they better model the actual characteristics of the area of interest. For example, a data set may include pseudo-wells at a given depth, shallower than the depth of interest. In this case, the pseudo-well data may be transformed using known techniques so that they are appropriate to the depth of interest.

In the case of generated pseudo-wells, existing data, or transformed data, there may be data that correspond to non-physical conditions (for example, a negative Poisson's ratio). Application of physical constraints may be used to remove such non-physical data.

Furthermore, it may be useful to include geological constraints which may include, for example, the situation in which there is advance knowledge of the deposition environment of the material. In this case, that knowledge may allow the modeler to determine information regarding what types of materials are likely to be present as well as what relationship various layers are likely to have. By way of example, an eolian deposition environment would tend to include sandstones that are relatively free of clay and relatively well-sorted. In contrast, deltaic sandstones would tend to be higher in clay content. In order to render the hypothetical physical properties more relevant to the analysis of the acquired seismic data, the types of sandstone generated would depend, at least in part, on whether the region under investigation includes wind-deposited or river delta deposited material and could be further differentiated based on specifics of the deposition environment. This type of constraint may be applied to the generation of data or to sorting operations that may be performed on data sets to ensure that the data tend to reflect the geological reality.

Figures 5A, 5B:
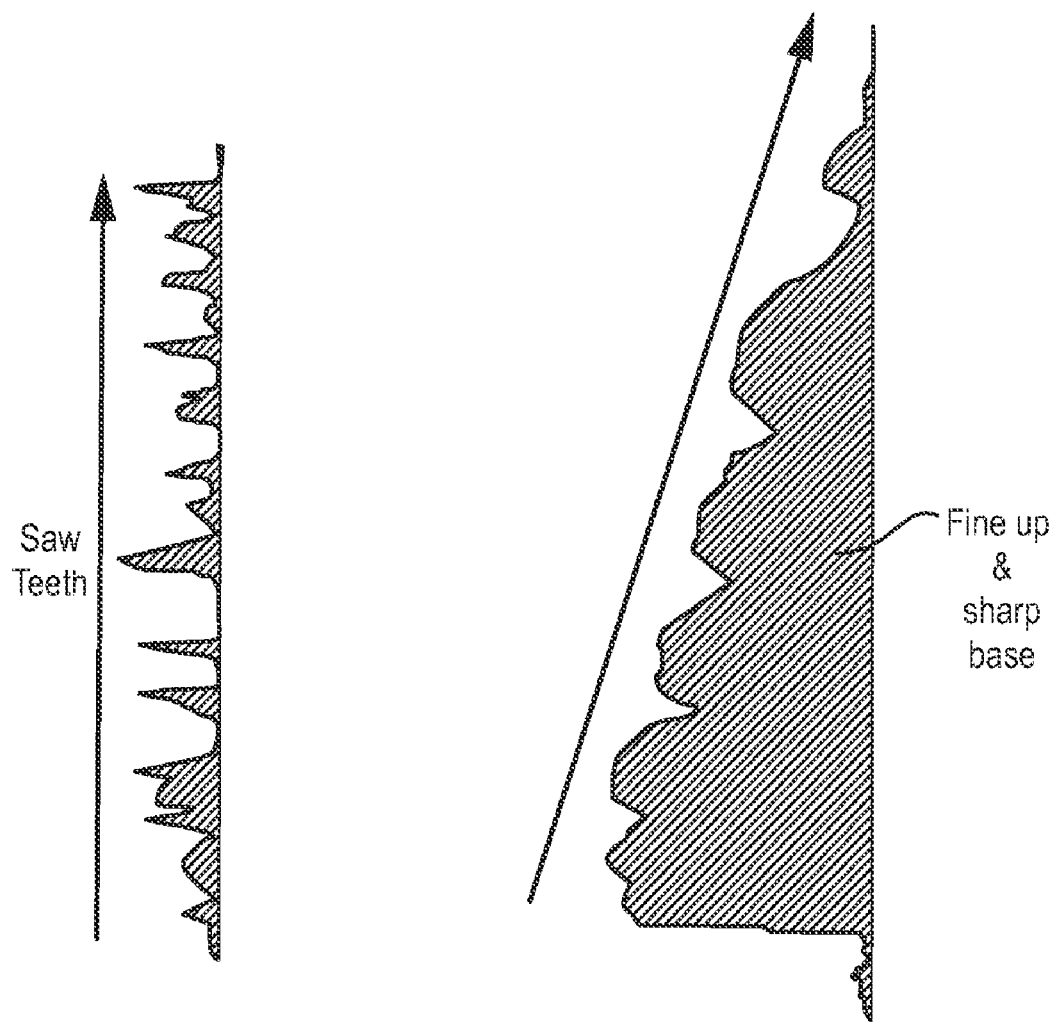
FIGS. 5A and 5B illustrate geological constraints that may be used in a method in accordance with an embodiment of the present invention.

In particular examples, as shown in FIG. 5A, an aggrading environment may produce a sawtooth structure and may correspond to a fluvial floodplain deposition environment. By way of comparison, FIG. 5B illustrates a retrograding model of a point bar (which may be fluvial or tidal in origin) in which a sharp base and upward fining are likely. In implementation, it may be useful to include a graphical user interface by which a user may select a particular model, along with parameters relevant to that model. For example, a total number of pseudo-wells to be generated, a depth at which the pseudo-wells are to begin, a number of layers to be generated within the pattern (e.g., a number of saw tooth layers or a number of fining sequence layers) and an incremental thickness. Other parameters may be input as necessary or useful.

In an alternate approach, where there is local information available (e.g., from cores or wireline data from nearby wells), that information may be used as a basis for geophysical constraint of the model. Likewise, combinations of local information and depositional environment information may be used where available.

Once the geophysically constrained physical properties have been generated, forward modeling is used to compute synthetic seismic data (108), i.e., synthetic seismograms. That is, the models are used to calculate sets of seismic data that would correspond to measured data for the pseudo-wells. As part of this process, the calculations to determine the synthetic data may use a variety of wavelets as models for the seismic waves. Wavelets may be, for example, calculated from the measured seismic data. Alternately, they can be computed based on theoretical considerations.

One example of an appropriate wavelet is a 40 Hz Ricker wavelet. As will be appreciated, wavelet parameters may be varied, for example, the wavelet length may vary between about 40-200 ms, and the wavelet bandwidth may be between about 10 and about 50 Hz. In a particular implementation, the inventors have found that a 60 ms, 40 Hz wavelet may provide useful results.

The sets of synthetic seismic data corresponding to the pseudo-wells are used to compute seismic attributes (110) in a process analogous to the initial computation of seismic attributes (102). That is, the synthetic data may be processed as if they were actually acquired by standard seismic exploration techniques to determine slope, intercept, and/or other relevant attributes. In particular, the synthetic data may be processed to determine the same attributes as the actual data, which would tend to aid in direct comparisons between the two.

Once the synthetic attributes are available, Bayesian analysis is applied (112) to the computed seismic attributes from the acquired seismic data using the computed seismic attributes corresponding to the computed synthetic seismic data. One example of such a Bayesian analysis is shown below in Eqn. 1:

$$P(l_1,t|s,g)=P(s,g|l_1,t)*P(l_1,t)/P(s,g) \qquad \text{Eqn. 1}$$

Where $P(l_1, t)$ is the probability of a layer of type one (e.g., a gas sand layer) and thickness t, while s and g denote stack and gradient attributes. That is, the equation states that the probability of finding a gas sand layer of thickness t given a particular pair of stack and gradient values is equal to the probability of measuring a particular stack and gradient given a gas sand layer of thickness t, times the probability of finding a gas sand layer of thickness t, divided by the probability of measuring the particular stack and gradient.

Though the above equation relates to the likelihood of finding a layer of a particular type and a particular thickness, it applies in principle to any particular geological property. That is, the presence of hydrocarbons (i.e., likelihood of gas vs. oil vs. brine vs. background as discussed below in relation to FIGS. 6A and 6B), porosity, saturation, net-to-gross, and other interpretations of seismic data may be subject to the same methodology.

Figure 6B:
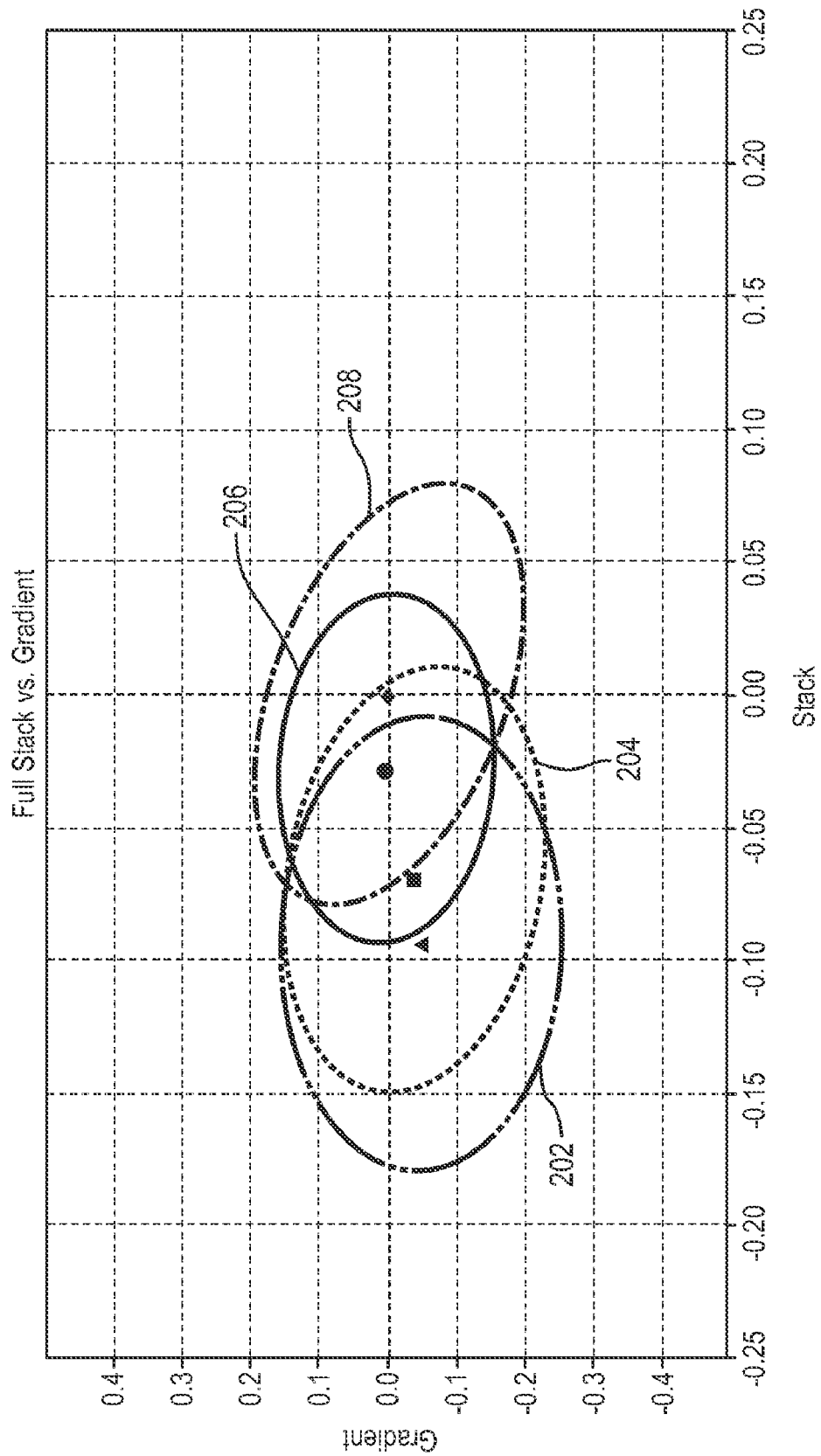

An embodiment includes a graphical user interface that can allow for visual comparisons along with the quantitative calculated comparisons. As shown in FIGS. 6A and 6B, a visual representation of the synthetic data may be displayed. In the example shown, a two-dimensional attribute space is displayed, in particular, stack vs. gradient. The synthetic wells are plotted in the attribute space and are broken down into wells containing gas 202, oil 204, brine 206, or nothing 208 (i.e., background). FIG. 6A displays each well plot while FIG. 6B illustrates the same data using ellipses that represent probability boundaries (i.e., P10/P50/P90 iso-lines) for the type of material. A visual comparison of an actual attribute pair allows a user to quickly determine whether that pair falls into one of the ellipses of interest and whether that pair is solely within one ellipse or within an overlapping region contained in more than one ellipse. Either alternately or in conjunction with the qualitative visual display, a quantitative comparison can be made and a more precise probability for each outcome can be produced and made available for display or for additional calculation.

Similar ellipses may be generated for any of the characteristics of interest as described above. For example, thickness, porosity, net-to-gross can be produced in a manner analogous as that used for fluid type identification. Furthermore, a similar methodology can be used to compare different geological models and probabilistic maps can be generated. For example a probabilistic fluid map may be generated based on stack and amplitude data while net thickness maps may be generated based on a variety of seismic attributes.

As will be appreciated, the various functions of generating pseudo-wells, analysis of seismic data, forward modeling of synthetic seismic data, and Bayesian analysis, may be implemented as modules of a common software program or may be implemented as separate software programs. Where separate software programs are used, it may be useful to ensure a common data format, or to provide a data format translation module that converts data from one format to another.

In a variation that is applicable to the above embodiments, it is possible to apply a thresholding operation so that very low probabilities are ignored. Likewise, any of the above embodiments may include iterative steps whereby estimates of the prior information are corrected based on results of a previous iteration of the method. For example, where the probabilistic analysis indicates that the actual seismic data is very likely to be indicative of a particular geologic structure, that structure may form a geological constraint for use in generating a new set of pseudo-wells.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, though reference is made herein to a computer, this may include a general purpose computer, a purpose-built computer, an ASIC programmed to execute the methods, a computer array or network, or other appropriate computing device. As a further example, it is to be understood that the present invention contemplates that, to the extent possible, one or more features of any embodiment can be combined with one or more features of any other embodiment.

What is claimed is:

1. A method of predicting subsurface properties of a geologic formation comprising:
   inputting seismic data for a subsurface region including the geologic formation into a computer comprising one or more processors;
   executing, via the computer, the steps of:
      computing amplitude versus offset seismic attributes from the seismic data;
      physically constraining modeled data representing hypothetical physical properties for at least a portion of the geologic formation;
      computing synthetic seismic data from the physically constrained modeled data;
      computing synthetic amplitude versus offset seismic attributes based on the computed synthetic seismic data; and
      applying Bayesian analysis using at least two of the computed synthetic amplitude versus offset seismic attributes, to predict a probability of a particular subsurface property given the measured amplitude versus offset seismic attributes.

2. A method as in claim 1, wherein the modeled data comprise pseudo-wells.

3. A method as in claim 1, wherein the constraining comprises ensuring that the hypothetical physical properties correspond to geological formations that are physically possible.

4. A method as in claim 1, further comprising applying geological constraints derived from a geological environment of deposition of the geologic formation to the modeled data.

5. A method as in claim 4, wherein the applying geological constraints comprises sorting the modeled data based on the environment of deposition.

6. A method as in claim 4, wherein the applying geological constraints is performed before or during generation of the modeled data.

7. A method as in claim 1, wherein the at least two amplitude versus offset seismic attributes are selected from the group consisting of amplitude, slope, gradient, curvature, intercept, near angle, far angle, near stack, and far stack.

8. A method as in claim 1, further comprising displaying the computed synthetic amplitude versus offset seismic attributes and the computed amplitude versus offset seismic attributes to a user such that the results of the Bayesian analysis including a probability of a physical interpretation of the computed amplitude versus offset seismic attributes are graphically conveyed in image form.

9. A method as in claim 1, wherein the particular subsurface property comprises a fluid type.

10. A method as in claim 1, wherein the particular subsurface property comprises a net thickness of a layer of interest.

11. A method as in claim 1, wherein the particular subsurface property comprises a porosity of a layer of interest.

12. A method as in claim 1, wherein the particular subsurface property comprises a lithology of a layer of interest.

13. A method as in claim 1, wherein the physically constraining is performed before or during generation of the modeled data.

14. A method as in claim 1, wherein the physically constraining is performed after generation of the modeled data.

15. A system for predicting subsurface properties of a geologic formation comprising:
   a memory configured to store data including seismic data representing a subsurface region including the geologic formation;
   a processor, configured and arranged to compute amplitude versus offset seismic attributes from the seismic data and to compute synthetic seismic data from modeled data and to compute amplitude versus offset seismic attributes corresponding to the computed synthetic seismic data; and
   to predict a probability of a particular subsurface property by applying Bayesian analysis to the computed amplitude versus offset seismic attributes from the seismic data using at least two of the computed amplitude versus offset seismic attributes corresponding to the computed synthetic seismic data.

16. A system as in claim 15, further comprising, a user interface, the user interface being configured and arranged to allow a user to input selected parameters to control the system.

17. A system as in claim 16, wherein the user interface is a graphical user interface and the user may use the graphical user interface to input selected parameters to apply a geological constraint to the modeled data.

18. A system as in claim 16, wherein the user interface is a graphical user interface and the user may use the graphical user interface to input selected parameters to control a manner in which the system displays results of the Bayesian analysis.

* * * * *